(12) United States Patent
Alvarez et al.

(10) Patent No.: US 8,215,700 B2
(45) Date of Patent: Jul. 10, 2012

(54) VEHICLE WINDOW/GARNISH ASSEMBLY AND SEAL DESIGN THEREFOR

(75) Inventors: Jorge L. Alvarez, Dublin, OH (US); Michael N Peterson, Columbus, OH (US); Brock Jared Stull, Columbus, OH (US); Takuji Ohara, Dublin, OH (US); Kenneth M. Hartlaub, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 187 days.

(21) Appl. No.: 12/750,803

(22) Filed: Mar. 31, 2010

(65) Prior Publication Data
US 2011/0241370 A1 Oct. 6, 2011

(51) Int. Cl.
*B60J 5/00* (2006.01)
(52) U.S. Cl. .......... 296/146.9; 296/1.08; 296/146.15
(58) Field of Classification Search .......... 296/146.9, 296/1.08
See application file for complete search history.

(56) References Cited

U.S. PATENT DOCUMENTS

| | | | |
|---|---|---|---|
| 5,472,258 A | 12/1995 | Merguro et al. | |
| 5,860,692 A * | 1/1999 | Nozaki et al. | 296/146.9 |
| 6,810,624 B2 | 11/2004 | Fujimura et al. | |
| 2004/0079032 A1 | 4/2004 | Russell et al. | |
| 2004/0088925 A1 | 5/2004 | Nozaki | |
| 2005/0022454 A1 | 2/2005 | Aida et al. | |
| 2005/0050800 A1 | 3/2005 | Ueda et al. | |
| 2005/0189775 A1 | 9/2005 | De Pue | |
| 2006/0032181 A1 | 2/2006 | Recker | |
| 2008/0246303 A1 | 10/2008 | Ryan et al. | |
| 2008/0258496 A1 | 10/2008 | Foster et al. | |
| 2009/0072581 A1 | 3/2009 | Rich et al. | |
| 2009/0165278 A1 | 7/2009 | Kondo et al. | |
| 2009/0230723 A1 | 9/2009 | Huang et al. | |

FOREIGN PATENT DOCUMENTS

JP 360022525 A 2/1985
* cited by examiner

*Primary Examiner* — Dennis Pedder
(74) *Attorney, Agent, or Firm* — Fay Sharpe LLP

(57) ABSTRACT

A vehicle window/garnish structure is described including a window/garnish and a trim structure, as well as a cost effective seal that covers body colored structures in the door cut line to maintain a consistent unbroken styling appearance.

19 Claims, 7 Drawing Sheets

VEHICLE WINDOW/GARNISH ASSEMBLY AND SEAL DESIGN THEREFOR

BACKGROUND

The present disclosure relates generally to vehicle window/garnish assemblies and more particularly to vehicle window/garnish assemblies adjacent vehicle doorways with seal designs adapted to cover body colored structures in the door cut line. In the automotive industry, it is known to paint doorway walls with body-colors and to provide garnish strips or other trim components along doors and windows, and it is desirable to cover body colored structures in the door cut line to maintain a consistent unbroken styling appearance. Seals are often provided between a quarter-window/garnishes and the adjacent door, but frictional wear due to contact with door components may eventually lead to seal rupture and/or squeak noise. Wear issues are commonly addressed by fabricating the seal using two materials or using coated and uncoated portions of a seal to provide a solid base for installation and a low friction portion to engage the door with reduced friction wear. However, construction of such conventional seals suffers from high component cost, requiring multiple tools and/or coating process steps for part creation.

SUMMARY

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

One or more aspects of the present disclosure provide a vehicle window/garnish assembly that includes a stationary or movable window or garnish (hereinafter window/garnish) having an outer surface and a forward edge surface proximate a vehicle doorway. Certain embodiments of the window/garnish assembly may include a trim structure disposed around a portion of outward surfaces of the window that includes one or more trim portions including a forward edge surface proximate the vehicle doorway. The window/garnish assembly also includes a seal structure at least partially extending between the doorway and the forward edge surfaces of the window and of the trim portions to block external view of body colored portions of the vehicle at least partially in the doorway near the forward edge surfaces of the window and trim structure when an associated door assembly is closed. In certain embodiments, the seal structure is formed of a single material, and the seal may include one or more portions that deflect when engaged against a body colored portion of the doorway when the seal structure is installed onto the vehicle.

Certain embodiments of the seal structure block external viewing along a direction generally perpendicular to a plane of the window of body colored portions of the doorway proximate the forward edge surfaces of the window/garnish assembly when the door is closed. The seal structure in certain embodiments engages at least a portion of the forward edge surfaces of the window/garnish assembly along the entire vertical extent of the forward edge surfaces of the window and of any provided trim structure. In certain embodiments, moreover, the seal structure does not contact the door assembly. One or more of the forward edge surfaces of the window and the forward edge surface(s) of the trim structure face the door assembly in certain embodiments when the door is closed. In certain embodiments, the seal structure includes a forward edge surface facing a rearward edge of a window, door handle assembly, and/or of a door trim structure of the door assembly when the door is closed.

In accordance with further aspects of the disclosure, a vehicle window/garnish assembly is provided, including a window/garnish, such as a stationary window or garnish designed to appear like a window, with an outer surface and a forward edge surface proximate a vehicle doorway, as well as a trim structure with a forward edge surface proximate the vehicle doorway. The window/garnish assembly further includes a seal structure extending at least partially between the doorway and the forward edge surfaces of the window and of the trim structure. The seal structure includes a forward edge surface facing a rearward edge of a window, door handle assembly, and/or a door trim structure of the door assembly when the door is in the closed position. The seal structure in certain embodiments does not contact the door assembly and may be formed of a single material. The seal, moreover, may include at least one deflected portion that deflects when engaged against a body colored portion of the doorway when installed in the vehicle. In certain embodiments, the seal engages all or at least portions of the forward edges of the window/garnish and of the trim structure along the entire vertical extent of the forward edge surfaces of the window/garnish assembly.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1A:
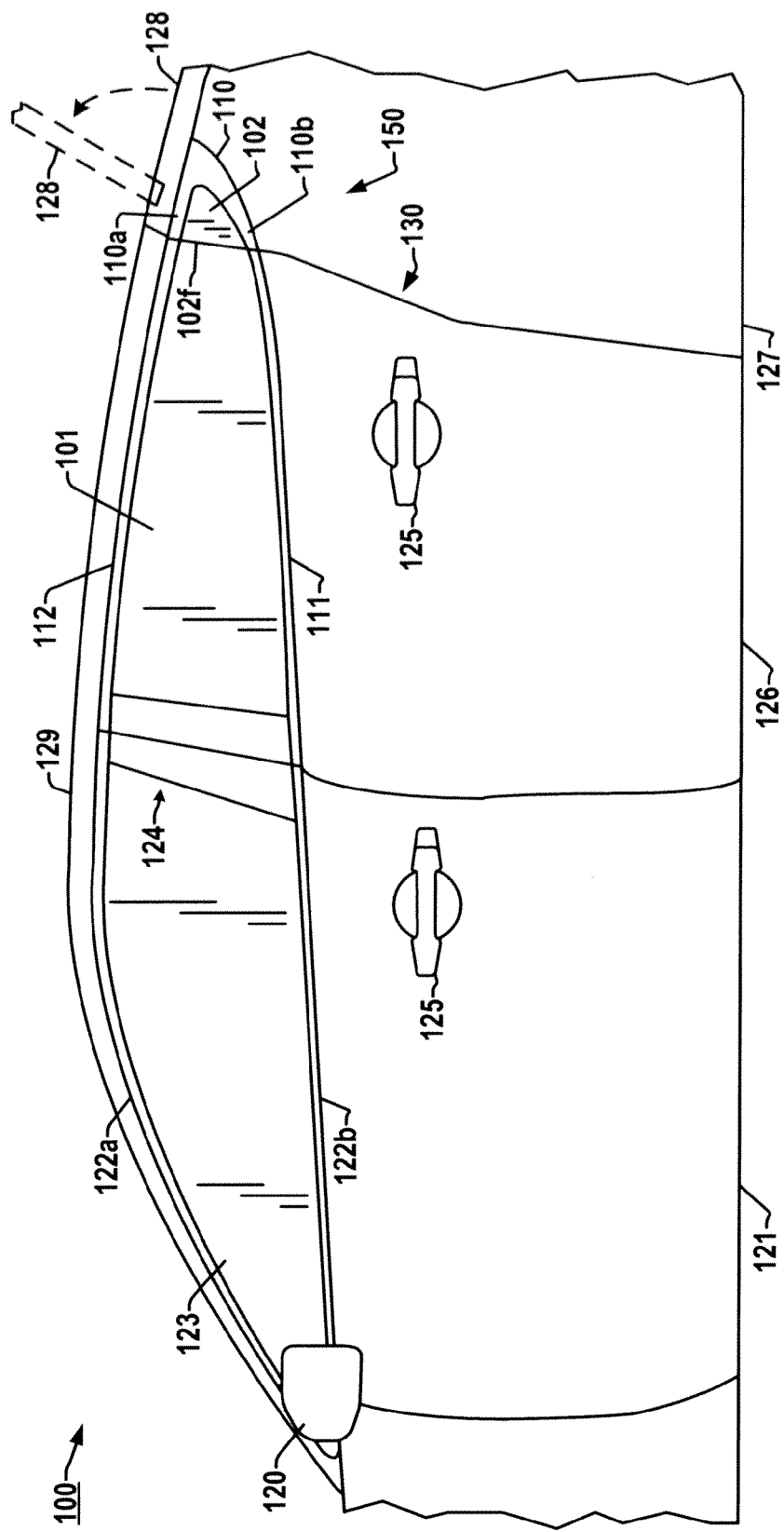
FIG. 1A is a side elevation view illustrating a middle portion of an automotive vehicle having a quarter window/garnish assembly with a stationary window in which one or more window/garnish assembly seal structure aspects of the present disclosure may be implemented.

One or more embodiments or implementations are hereinafter described in conjunction with the drawings, where like reference numerals are used to refer to like elements throughout, and where the various features are not necessarily drawn to scale.

FIG. 1A illustrates portions of an exemplary four-door automotive vehicle 100, including a front (driver) door assembly 121 and a rear door assembly 126, each having door handles 125 for user access to the vehicle passenger compartment. The described window/garnish seal structure concepts also find utility in 2 door vehicles and vehicles with any number of doors. The front door assembly 121 includes a retractable (movable) window 123 within a window opening behind a side-view mirror assembly 120 and forward of a center pillar structure 124 with an upper trim piece 122a between the window 123 and the vehicle roof 129 and a lower trim structure 122b between the window 123 and the door panel 121. The rear door assembly 126 includes a fully or partially retractable window 101 positioned between the pillar 124 and a stationary rear quarter window/garnish assembly 150, with window trim pieces 111 and 112 respectively above and below the window pane 101. Rearward of the lower portion of the door assembly 126 is a quarter panel structure 127 formed of body-colored steel, which extends forward to partially define the back edge of a doorway 130 for the rear door assembly 126. The roof 129 extends from a front windshield (not shown) rearward to a hatch assembly 128 (shown in an open position in dashed line in FIG. 1A), where the hatch assembly 128 is adjacent an upper portion of the stationary quarter window/garnish assembly 150 when closed.

Figure 1B:
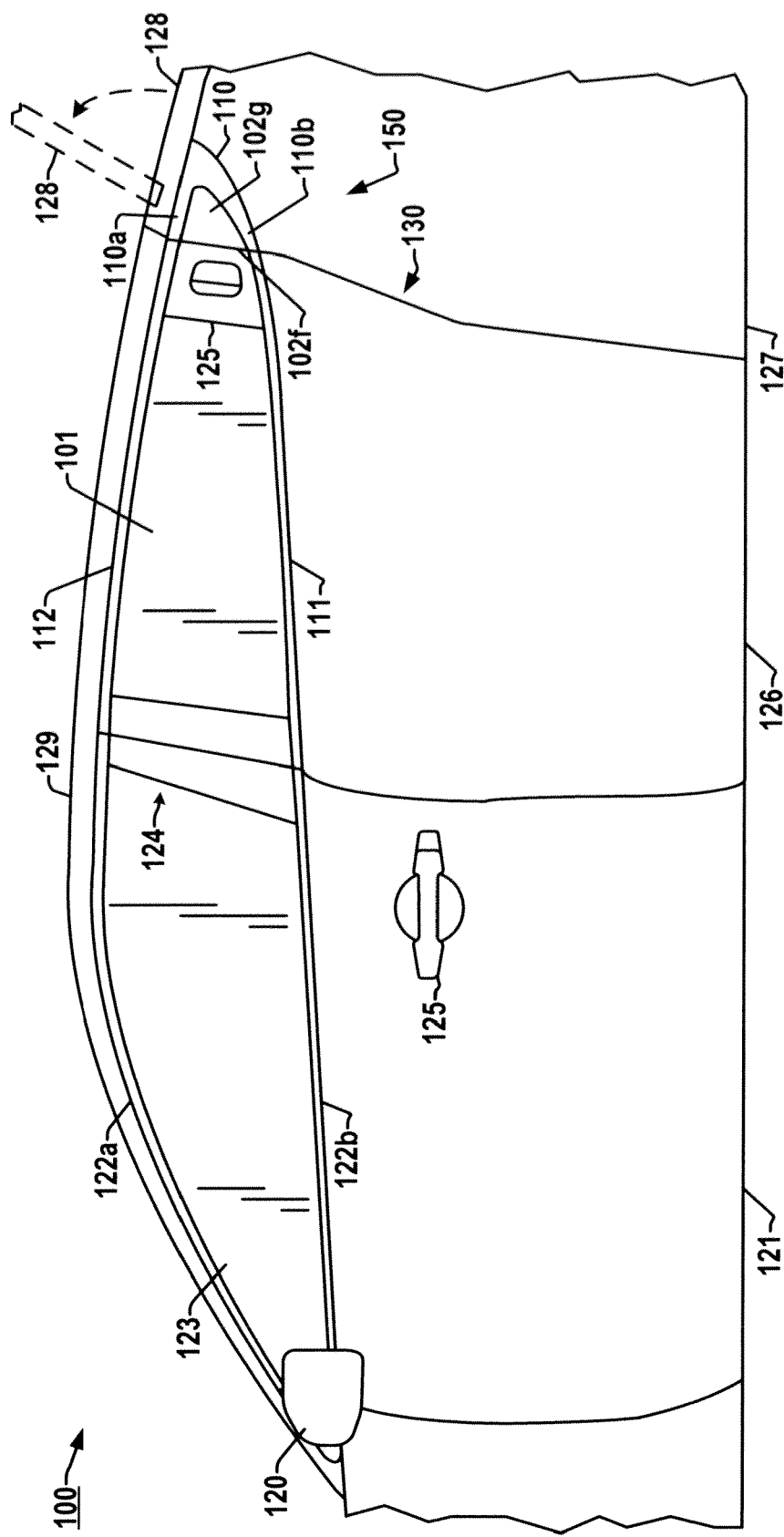
FIG. 1B is a side elevation view illustrating another vehicle in which the rear door includes a door handle assembly with a rearward surface facing a quarter window/garnish having a garnish and seal structure in accordance with one or more aspects of the present disclosure.
Figure 2A:
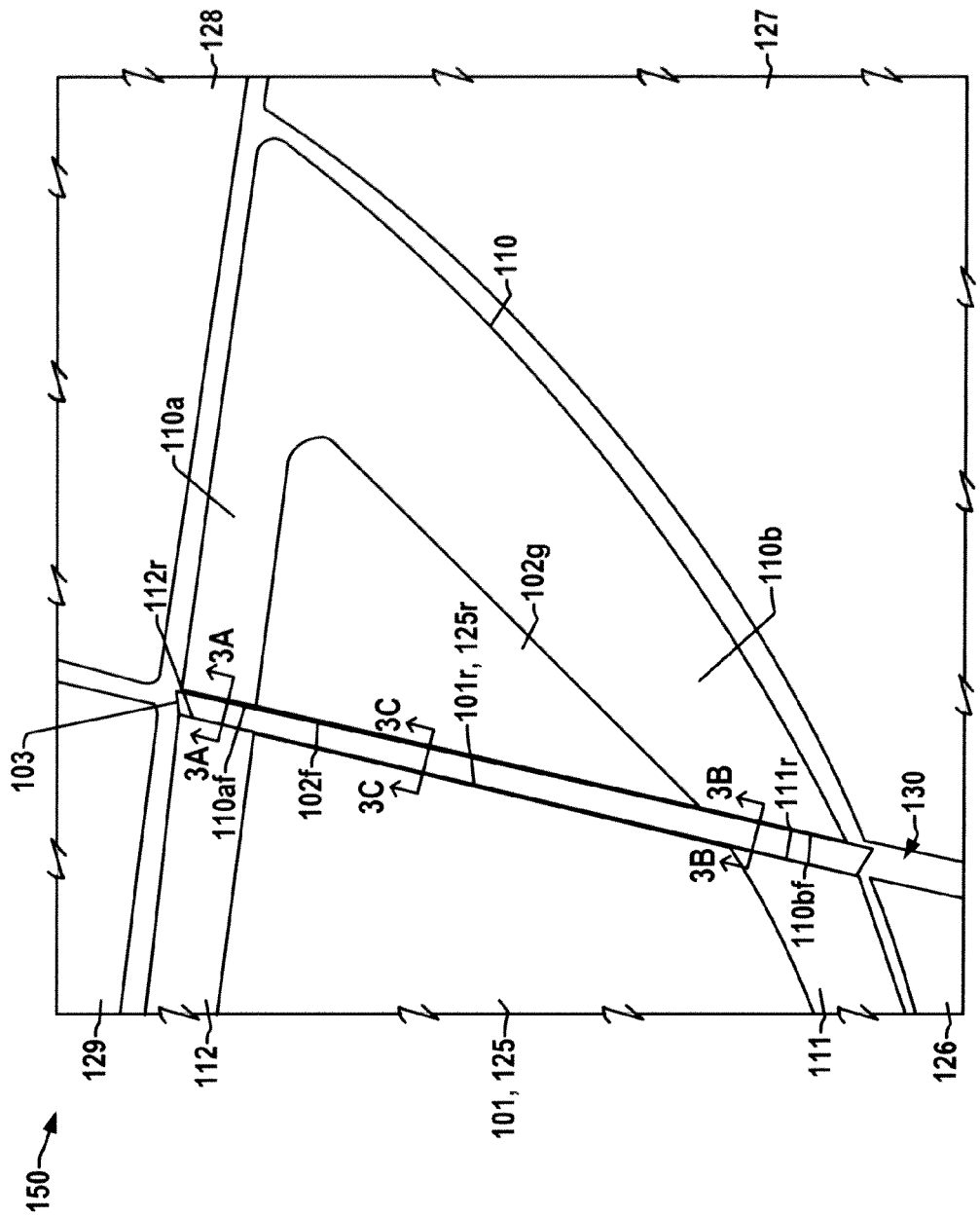
FIG. 2A is a partial side elevation view showing a stationary quarter-window/garnish assembly in the vehicle of FIG. 1B including seal structure blocking view of body-colored portions of the vehicle doorway near forward edges of the quarter-window/garnish and associated trim structure when the rear door is closed.

FIG. 1B illustrates another exemplary vehicle 100 similar to that shown in FIG. 1A, in which the rear quarter window/garnish assembly includes a garnish structure 102g, which may be fashioned to look like a tinted window from the outside in certain embodiments, or which may include body coloring in other embodiments. In the embodiment of FIG. 2A, moreover, the rear door assembly 126 includes a rear door handle assembly 125 mounted forward of the window/garnish assembly 150. The rear door handle assembly 125 could also be a garnish or glass in other embodiments. As used herein, a window/garnish assembly may, but need not, include a window (e.g., such as quarter window 102 in FIG. 1A), and may, but need not, include a trim structure (e.g., trim structure 110 in FIGS. 1A and 1B). The window/garnish assembly, moreover, includes a seal structure 103 as described further below, having a forward edge surface (e.g., edge 102f in FIGS. 1A and 1B) facing a rearward edge of a window 101 of the door assembly 126, a rearward edge of a door handle assembly 125 of the door assembly, and/or a rearward edge of a door trim structure 111, 112 of the door assembly 126 when the door is closed.

Figure 2B:
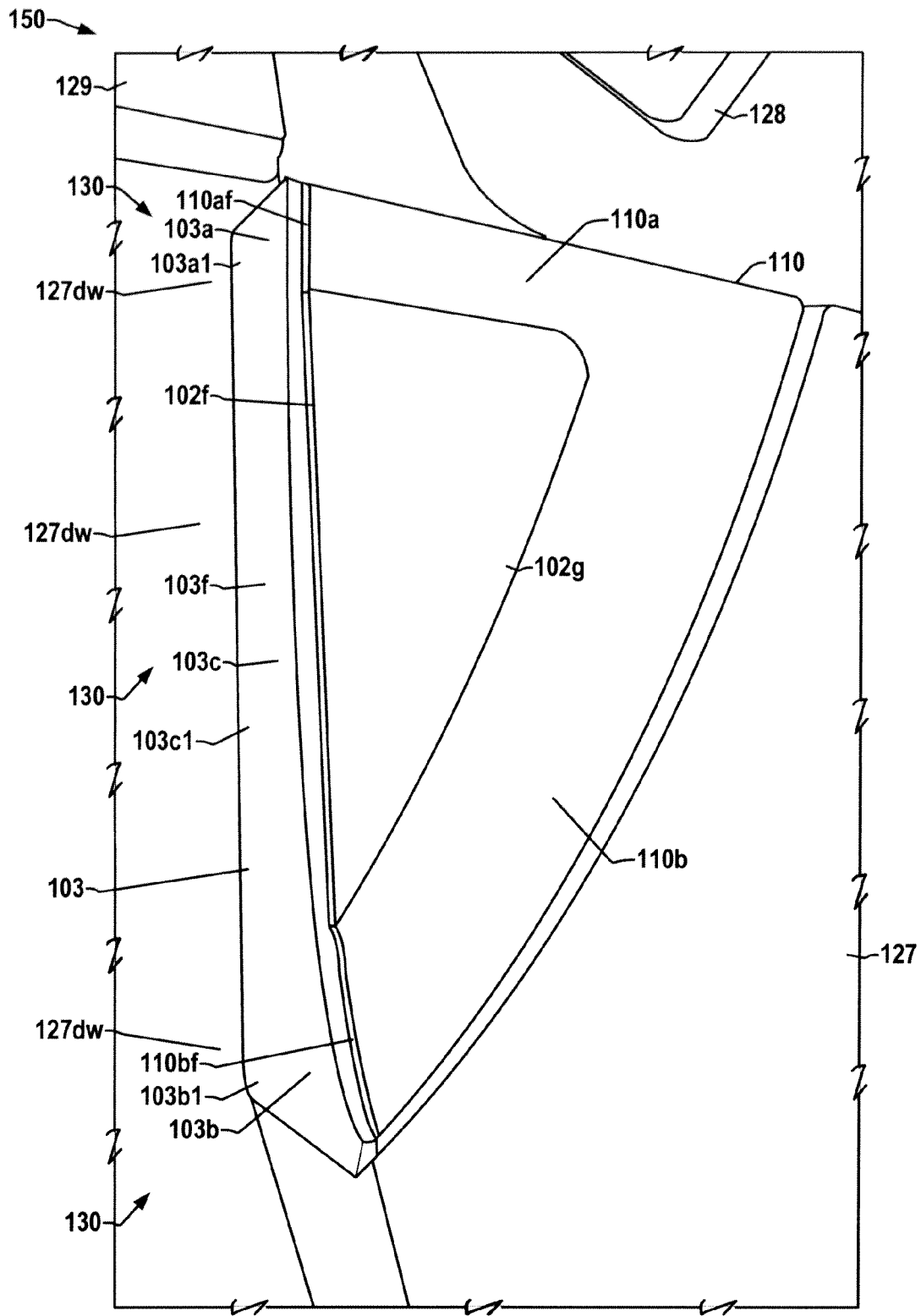
FIG. 2B is a partial side elevation view showing the stationary quarter-window/garnish assembly in the vehicle of FIGS. 1B and 2A and portions of the adjacent doorway when the rear door is open.

Referring also to FIGS. 2A and 2B, further details of the stationary quarter window/garnish assembly 150 are shown. FIG. 2A shows details of the stationary quarter-window/garnish assembly 150 with the rear door 126 in a closed position with the door cut line covered near the window/garnish assembly 150, and FIG. 2B illustrates the assembly 150 when the door 126 is opened to expose the doorway 130 to external view. The exemplary window/garnish assembly 150 is positioned rearward of the upper portion of the door assembly 126, and includes a window pane/garnish 102, 102g mounted to the vehicle 100 with an outer surface facing outwardly of the vehicle 100 and also having a forward edge surface 102f that is proximate the upper portion of the doorway 130 associated with the rear driver-side door assembly 126. Although the exemplary quarter-window/garnish assembly 150 includes a stationary rear window pane/garnish 102, 102g other embodiments are possible in which window/garnish assemblies embodying one or more seal structure aspects of the present disclosure include a movable window/garnish and/or in which the window/garnish assembly 150 is positioned in other locations of a vehicle 100, such as stationary or movable front windows/garnish structures positioned forward or a front door assembly (e.g., door 121 in FIGS. 1A and 1B) or between front and rear door assemblies (e.g., between door 121 and door 126 in FIGS. 1A and 1B). The window 102 or garnish 102g, moreover, may be transparent or translucent or may even be covered by decorative plastic or metal that does not allow transmission of light, such as a replacement quarter window louver kit, etc.

The illustrated window/garnish assembly 150 also includes a trim structure 110 positioned around all or a portion of one or more outward surfaces of the window/garnish 102, 102g proximate at least two edges of the window/garnish 102 in the illustrated examples, and having at least one forward edge or surface 102f, 110af, 110bf proximate the doorway 130. In the embodiment of FIG. 2B, for example, the trim structure 110 includes a first or upper trim portion 110a with a forward edge surface 110af as well as a second (lower) trim portion 110b having a forward edge surface 110bf proximate the vehicle doorway 130, where the edge surfaces in certain embodiments are not visible as instead being covered in whole or in part by garnish or the seal structure 103, and where the trim portions 110a and 110b in one embodiment are both part of a unitary trim structure 110. In other possible embodiments, the trim portions 110a and 110b can be separate structures. In further embodiments, the trim structure 110 only includes a single portion (e.g., upper or lower) with only a single forward edge. In other embodiments, no trim structure 110 is included in the window/garnish assembly 150.

In addition, the window/garnish assembly 150 includes a seal structure 103 that wholly or partially blocks the external view of body-colored portions of the vehicle doorway 130 near the forward edge 102f of the quarter-window/garnish 102 and near the forward edges 110af, 110bf of the trim structures 110a and 110b when the rear door 126 is closed. As best shown in FIGS. 2A and 2B, the illustrated seal structure 103 extends at least partially between the doorway 130 and the forward edge surfaces 102f, 110af, 110bf of the window assembly 150 to at least partially block external view of body colored portions 127dw of the vehicle 100 in the doorway 130 proximate the forward edge surfaces 102f, 110af, 110bf of the window 102 and of the first and second trim portions 110a, 110b when the door assembly 126 is in the closed position (FIG. 2A). As best shown in FIG. 2B, the exemplary seal 103 includes a first or upper portion 103a engaging the body-colored doorway wall 127 and extending outwardly to cover all or a portion of the forward edge surface 110af of the upper trim portion 110a. In addition, a middle portion 103c of the seal 103 engages the doorway wall 127dw and extends outwardly to cover all or a portion of the forward edge surface 102f of the stationary window 102 (or garnish 102g), and a lower seal portion 103b engages the doorway wall 127dw and extends outwardly to cover all or a portion of the forward edge surface 110bf of the lower trim portion 110b as shown in FIG. 2B.

In the illustrated embodiments, the seal structure 103 forms a sealing engagement with the window/garnish 102, 102g and with the trim portions 110a, 110b, and also forms a sealing engagement with the doorway wall 127dw although not a strict requirement of the present disclosure. Moreover, the exemplary seal structure 103 in certain embodiments is a single piece formed of a single material including portions 103a, 103b, and 103c, although other embodiments may be constructed of two or more pieces joined by any suitable means. In addition, the seal structure 103 may include one or more coated portions, although not a requirement of the disclosure. In one implementation, the seal structure 103 is molded, extruded, or otherwise formed of a TPO or solid EPDM material, such as a PP/EPDM Thermoplastic elastomer including fully-cross linked EPDM in a polypropelin matrix having a seal hardness of about 60-75 Hs in a Shore A scale. Other possible embodiments may include multiple materials and/or coatings, such as a low friction EPDM sponge material portion to engage the door with reduced friction wear.

In this regard, as detailed further below in connection with FIGS. 3A-3C, the illustrated seal structure 103 does not contact the door assembly 126 in either the open or the closed position, and there is no contact between the door assembly 126 and the seal 103 in transitioning between the open and closed positions. Consequently, the exemplary seal structure 103 may be made from a single material without coatings, although contact is possible in one or more positions for other possible embodiments.

Figure 3A:
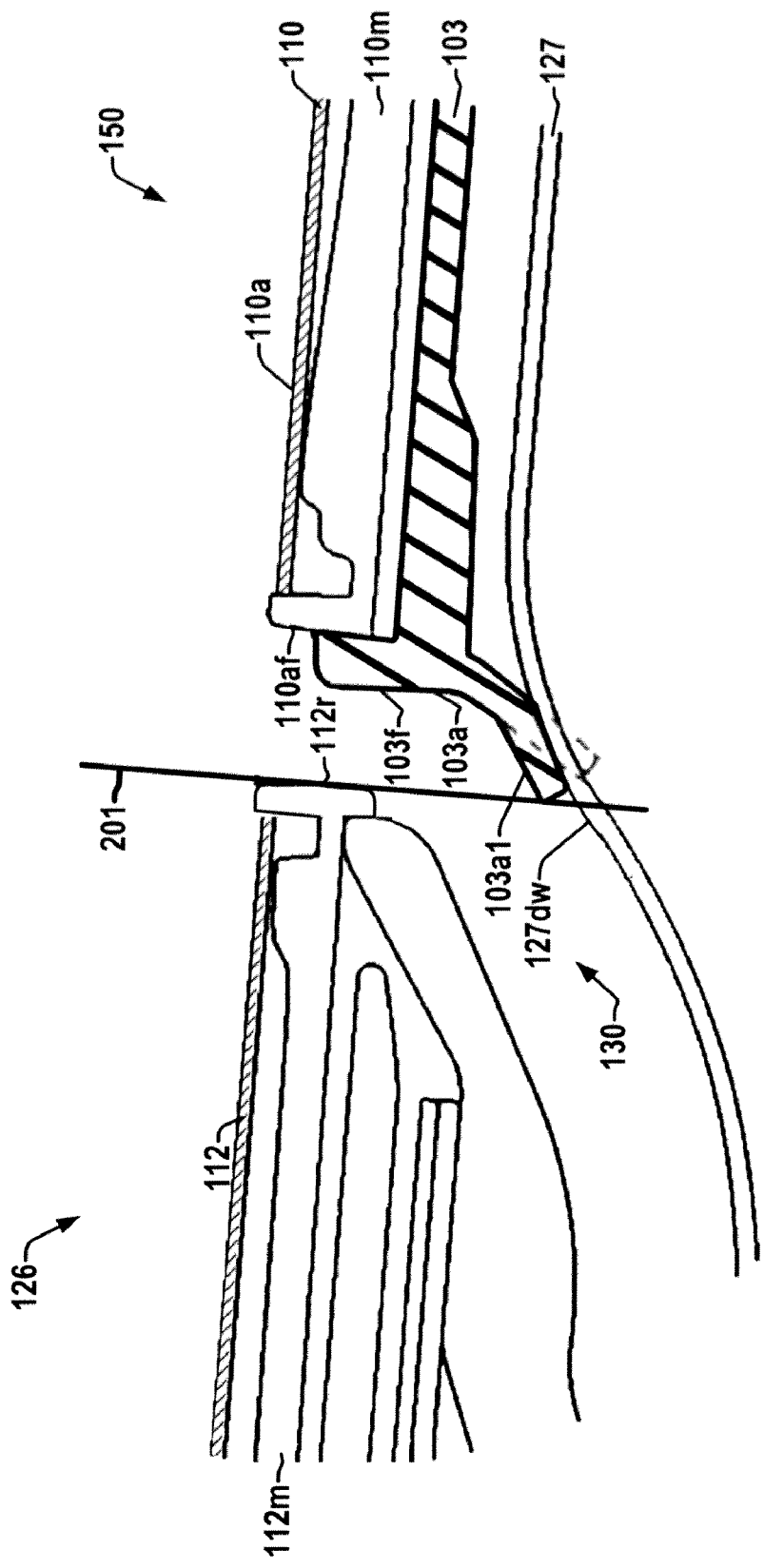
FIG. 3A is partial upward plan view in section illustrating the window/garnish assembly and seal structure taken along line 3A-3A in FIG. 2A.
Figure 3B:
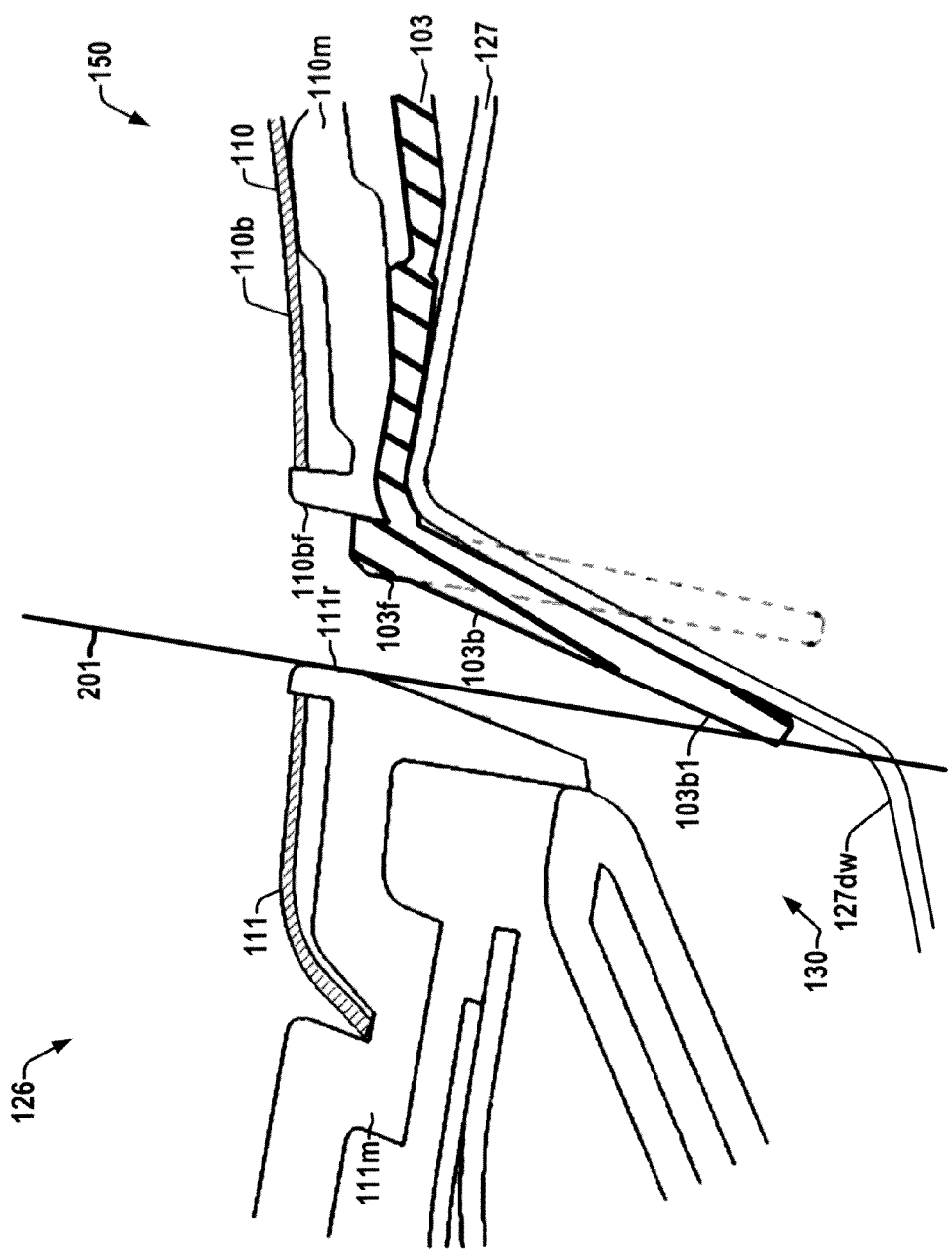
FIG. 3B is partial upward plan view in section illustrating the window/garnish assembly and seal structure taken along line 3B-3B in FIG. 2A.
Figure 3C:
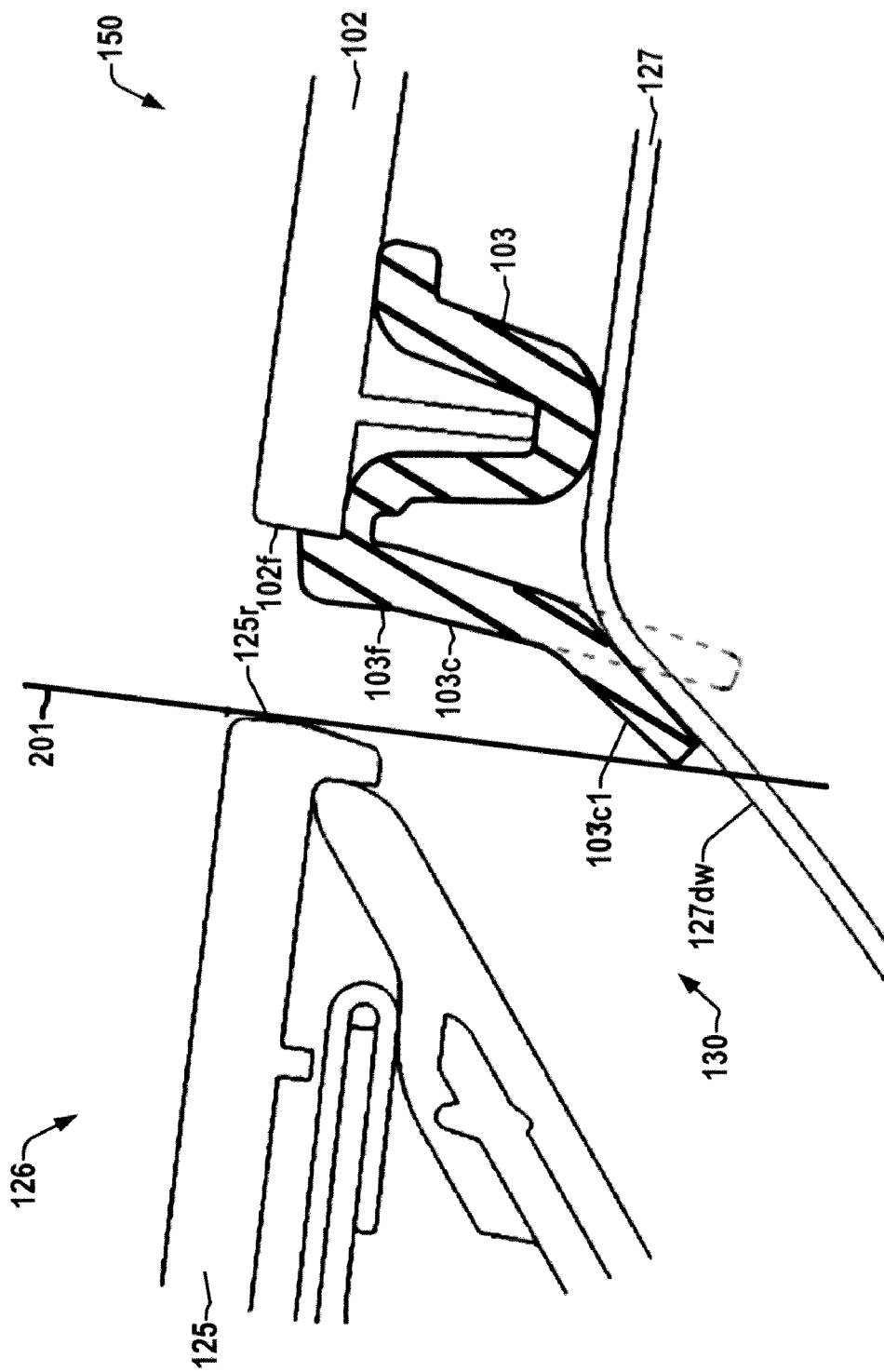
FIG. 3C is partial upward plan view in section illustrating the window assembly and seal structure taken along line 3C-3C in FIG. 2A.

Referring also to FIGS. 3A-3C, when the rear door assembly 126 is closed, the seal structure 103 blocks external view of the body-colored doorway wall 127dw along a direction 201 (FIGS. 3A-3C) generally perpendicular to a plane of the window/garnish 102, 102g at the door cut line near the forward edge surfaces 102f, 110af, and 110bf of the window/garnish 102, 102g and of the first and second trim portions 110a and 110b. In this regard, the exemplary line 201 extends along the rearward extent of the door assembly 120 and to the forward extent of the seal structure 103 in the illustrated examples. As best shown in FIG. 2B, the exemplary seal structure 103 engages at least a portion of the forward edge surfaces 102f, 110af, and 110bf of the window/garnish 102, 102g and of the first and second trim portions 110a and 110b along the entire vertical extent of the forward edge surfaces 102f, 110af, and 110bf of the window/garnish 102 and of the first and second trim portions 110a and 110b. This advantageously covers the body-colored doorway wall 127dw in the door cut line to maintain a consistent unbroken styling appearance without visible body-color between the opposing edges of the upper door trim 112 and the upper trim portion 110a of the quarter-window/garnish assembly 150 (e.g., FIG. 2A). The seal 103 also provides a styling appearance uninterrupted by body-color between a rearward edge 125r of the rear door handle assembly 125 (or of the rear door window 101 in the embodiment of FIG. 1A) and the forward edge 102f of the stationary window/garnish 102, 102g, as well as providing a consistent unbroken styling appearance between the opposing edges of the lower door trim 111 and the lower trim portion 110b of the window/garnish assembly 150.

As shown in FIGS. 3A-3C, the forward edge surface 102f of the quarter window/garnish 102, and the forward edge surfaces 110af and 110bf of the first and second trim portions 110a and 110b, along with the forward edge 103f of the seal 103 face the door assembly 126 with no contact between the door assembly 126 and the seal structure 103 when the door assembly 126 is in the closed position. Moreover, the forward edge 103f of the upper seal portion 103a directly faces the rear edge 112r of the upper door trim piece 112 (FIG. 3A), the forward edge 103f of the lower seal portion 103b directly faces the rear edge 111r of the lower door trim piece 111 (FIG. 3B), and the forward edge 103f of the middle seal portion 103c directly faces the rear edge 125r of the rear door handle 125 of the door assembly 126 (FIG. 3C, or faces the rearward edge of the rear door window 101 in the embodiment of FIG. 1A). In this regard, the trim pieces 111 and 112 of the door assembly 126 are retained by trim mounting structures 111m and 112m, respectively (FIGS. 3A and 3B), whose rearward edges 111r and 112r face the seal edge 103f across the door/doorway gap 130 without contact. In this embodiment, the clearance between the seal 103 and the door assembly 126 facilitates manufacture of the seal structure 103 as a single component, without requiring dual material construction or coating steps as was the case in conventional window assembly seals.

As shown in FIGS. 3A-3C, moreover, the seal structure 103 includes upper, lower, and middle portions 103a1, 103b1, 103c1, respectively, that deflect when engaged against the body colored portion 127dw of the doorway 130 when the seal structure 103 is installed onto the vehicle 100. As seen in these figures, the molded shape of the portions 103a1, 103b1, and 103c1 is shown in dashed line, and the installed (deflected) positions are shown in solid (section) lines. In this embodiment, the deflection of the portions 103a1, 103b1, and 103c1 ensures sealing engagement of the vertical extent of the forward portions of the seal structure 103 against the doorway wall 127dw. In addition, the forward deflection of the portions 103a1, 103b1, 103c1 aids in the overall coverage of the body-colored wall 127dw from external view in the door cut line when the door assembly 126 is in the closed position.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A window/garnish assembly for a vehicle, comprising:
a window/garnish mounted to the vehicle, the window/garnish being a single structure made of a single material including an outer surface facing outwardly of the vehicle, and a forward edge surface proximate a vehicle doorway; and
a seal structure at least partially engaging a doorway wall and fixedly engaging the forward edge surface of the window/garnish, wherein at least a portion of the seal structure directly contacts the forward edge surface of the window/garnish with no intervening structures between the portion of the seal structure and the forward edge surface of the window/garnish, and wherein at least a second portion of the seal structure directly contacts the doorway wall with no intervening structures between the second portion of the seal structure and the doorway wall, the seal structure being a single structure made of a single material extending at least partially between the doorway and the forward edge surfaces of the window/garnish to at least partially block external view of body colored portions of the vehicle in the doorway proximate the forward edge surface of the window/garnish when a door assembly associated with the doorway is in a closed position.

2. The window/garnish assembly of claim 1, further comprising a trim structure disposed around a portion of at least one outward surface of the window/garnish proximate at least one edge of the window/garnish, the trim structure including at least one forward trim edge surface proximate the vehicle doorway, wherein the seal structure extends at least partially between the doorway and the forward edge surface of the window/garnish and at least partially between the doorway and the at least one forward trim edge surface of the trim structure to at least partially block external view of body colored portions of the vehicle in the doorway proximate the forward edge surface of the window/garnish and proximate the at least one forward trim edge surface of the trim structure when the door assembly associated with the doorway is in the closed position.

3. The window/garnish assembly of claim 2, wherein the trim structure includes a first trim portion including a first forward trim edge surface proximate the vehicle doorway, and a second trim portion including a second forward trim edge surface proximate the vehicle doorway, and wherein the seal structure extends at least partially between the doorway and the forward edge surface of the window/garnish and between the doorway and the forward trim edge surfaces of the first and second trim portions to at least partially block external view of body colored portions of the vehicle in the doorway proximate the forward edge surface of the window/garnish and proximate the forward trim edge surfaces of the first and second trim portions when the door assembly associated with the doorway is in the closed position.

4. The window/garnish assembly of claim 3, wherein the seal structure engages at least a portion of the forward edge surface of the window/garnish and of the forward trim edge surfaces of the first and second trim portions along the entire vertical extent of the forward edge surfaces of the window/garnish assembly.

5. The window/garnish assembly of claim 3, wherein at least one of the forward edge surface of the window/garnish and the forward trim edge surfaces of the first and second trim portions faces the door assembly when the door assembly is in the closed position.

6. The window/garnish assembly of claim 2, wherein the seal structure blocks external view along a direction generally perpendicular to a plane of the window/garnish of body colored portions of the doorway proximate the forward edge surface of the window/garnish and the forward trim edge surfaces of the trim structure when the door assembly is in the closed position.

7. The window/garnish assembly of claim 2, wherein the seal structure engages at least a portion of the forward edge surface of the window/garnish and the forward trim edge surface of the trim structure along the entire vertical extent of the forward edge surface of the window/garnish and the forward trim edge surface of the trim structure.

8. The window/garnish assembly of claim 1, wherein the seal structure comprises at least one deflected portion that deflects when engaged against a body colored portion of the doorway when the seal structure is installed onto the vehicle.

9. The window/garnish assembly of claim 1, wherein the seal structure is spaced apart from the door assembly when the door assembly is in the closed position.

10. The window/garnish assembly of claim 1, wherein the seal structure includes a forward edge surface facing at least one of a rearward edge of a window of the door assembly, a rearward edge of a door handle assembly of the door assembly, and a rearward edge of a door trim structure of the door assembly when the door assembly is in the closed position.

11. The window/garnish assembly of claim 10, wherein the seal structure is spaced apart from the door assembly when the door assembly is in the closed position.

12. The window/garnish assembly of claim 1, wherein the window/garnish is stationary.

13. A window/garnish assembly for a vehicle, comprising:
 a window/garnish mounted to the vehicle, the window/garnish being a single structure made of a single material including an outer surface facing outwardly of the vehicle, and a forward edge surface proximate a vehicle doorway;
 a trim structure disposed around a portion of at least one outward surface of the window/garnish proximate at least one edge of the window/garnish, the trim structure including at least one forward edge surface proximate the vehicle doorway; and
 a seal structure at least partially engaging a doorway wall and the forward edge surface of the window/garnish wherein at least a portion of the seal structure directly contacts the forward edge surface of the window/garnish with no intervening structures between the portion of the seal structure and the forward edge surface of the window/garnish, and wherein at least a second portion of the seal structure directly contacts the doorway wall with no intervening structures between the second portion of the seal structure and the doorway wall, the seal structure being a single structure made of a single material extending at least partially between the doorway and the forward edge surfaces of the window/garnish and of the trim structure, the seal structure including a forward edge surface facing at least one of a rearward edge of a window of the door assembly, a rearward edge of a door handle assembly of the door assembly, and a rearward edge of a door trim structure of the door assembly when the door assembly is in the closed position.

14. The window/garnish assembly of claim 13, wherein the seal structure is spaced apart from the door assembly when the door assembly is in the closed position.

15. The window/garnish assembly of claim 13, wherein the seal structure comprises at least one deflected portion that deflects when engaged against a body colored portion of the doorway when the seal structure is installed onto the vehicle.

16. The window/garnish assembly of claim 13, wherein the seal structure engages at least a portion of the forward edge surfaces of the window/garnish and of the trim structure along the entire vertical extent of the forward edge surfaces of the window/garnish assembly.

17. The window/garnish assembly of claim 13, wherein at least one of the forward edge surface of the window/garnish and the forward edge surface of the trim structure faces the door assembly when the door assembly is in the closed position.

18. The window/garnish assembly of claim 13, wherein the seal structure is formed of a single material.

19. The window/garnish assembly of claim 13, wherein the window/garnish is stationary.

* * * * *